United States Patent

[11] 3,624,434

[72] Inventors Gene L. Dafler
New Lebanon;
Wayne V. Fannin, Dayton, both of Ohio
[21] Appl. No. 91,392
[22] Filed Nov. 20, 1970
[45] Patented Nov. 30, 1971
[73] Assignee General Motors Corporation
Detroit, Mich.

[54] BEARING SUPPORT ASSEMBLY FOR DYNAMOELECTRIC MACHINES AND A METHOD OF MANUFACTURE THEREFOR
5 Claims, 5 Drawing Figs.

[52] U.S. Cl. ................................................. 310/90,
310/239, 308/132
[51] Int. Cl. .................................................. H02k 5/16
[50] Field of Search ........................................... 310/90,
238, 239; 308/72, 132

[56] References Cited
UNITED STATES PATENTS
2,819,417 1/1958 Glass ............................ 310/90 X
3,013,167 12/1961 Bobula .......................... 310/90
3,416,847 12/1968 Daley et al. .................... 308/72 X

*Primary Examiner*—D. X. Sliney
*Attorneys*—E. W. Christen, C. R. Meland and Robert W. Smith ABSTRACT: In a preferred form, a bearing support assembly for dynamoelectric machines carries one end of the machine shaft so as to limit axial shaft movement. The shaft end is rotatable in a bearing which is axially confined on the shaft by a thrust collar. First and second annular retaining springs are mounted in the end of one of the housing case parts so as to provide support for opposite sides of the bearing. The method of assembling the shaft to the case part includes mounting the first retaining spring, the bearing, and the thrust collar to the shaft end and mounting the second retaining spring within the case part. The shaft is inserted axially into the case part so that the bearing initially engages the second retaining spring. The shaft end is pressed further until the first retaining spring snaps into place within the case part, whereupon the bearing support assembly is completed and the shaft end is supported therein with a predetermined axial end play.

INVENTORS
Gene L. Dafler &
BY Wayne V. Fannin
Robert W. Smith
ATTORNEYS

PATENTED NOV 30 1971 3,624,434

INVENTORS
Gene L. Dafler &
BY Wayne V. Fannin
Robert W. Smith
ATTORNEYS

BEARING SUPPORT ASSEMBLY FOR DYNAMOELECTRIC MACHINES AND A METHOD OF MANUFACTURE THEREFOR

Their invention relates to a bearing support assembly for dynamoelectric machines and to a method of manufacture therefor, and more particularly to an improved bearing support assembly for small dynamoelectric machines of the type having a rotor shaft which is mounted in one end of a divided housing so as to establish a desired limit of shaft movement.

In the design and manufacture of dynamoelectric machines including small or fractional horsepower motors, for example, one of the chief considerations is the cost of making the machine parts and assembling costs in a mass production type of manufacturing process. Typically, the machine rotor assembly or armature is first mounted on a shaft and then the shaft is rotatably mounted in one of a pair of case parts forming a divided machine housing. The other case part is then mounted to the opposite shaft end so that it is rotatable therein and the case parts are secured together to complete the assembling process. It is essential that the shaft ends be quickly assembled in relatively simple bearing support assemblies carried in the ends of the case parts. When the parts forming the machine are not held to especially close tolerances, which would substantially increase the cost of such machines, it has been found that substantial axial movement or end play may be left in the shaft after it has been assembled in the case parts. Excessive axial shifting of the shaft is known to cause noise, vibrations and excessive wear during operation of the machine. Therefore, it is necessary to limit the axial shaft movement.

In one method of manufacture of small motors, after one end of the shaft is assembled in a bearing support assembly of one case part, predetermined shaft end play is established by placing a washer on the shaft externally of the case part and clamping the washer in place by a small retaining ring. The washer is spaced from the end of the case part by a removable shim which establishes a predetermined end play. After the retaining ring is applied and the shim is removed, the shaft and the case part form a subassembly in which the shaft is supported therein with the desired end play. Since the fastening of the retaining ring and washer is a time consuming and cost increasing factor, it is desirable to provide an assembly which eliminates this manufacturing step.

In accordance with the present invention, a bearing support assembly for dynamoelectric machines permits assembly of the machine shaft to a divided housing case part so as to provide a desired limit of axial shaft movement for the final machine assembly. The shaft end assembled in this case part has a bearing rotatably mounted thereon between the end of the rotor assembly and a thrust collar fastened to the end of the shaft. The collar provides the desired bearing clearance between the end of a rotor assembly and the thrust collar. Prior to assembling, the inner end of the bearing carries a first annular retaining spring. A second annular retaining spring is mounted in an extended end portion of the case part. An annular lip, which partially encloses the opening to a recessed area formed by the extended end portion, holds the second retaining spring in place. After the shaft is assembled to the case part, the annular lip also holds the first annular retaining spring in place so that the bearing is supported between the two retaining springs. The shaft is assembled to the case part by inserting the shaft end toward the extended end portion such that the outer side of the bearing initially engages the second retaining spring. The outer diameter of the first annular retaining spring is resiliently compressed by the inner edge of the annular lip so as to guide the bearing into axial alignment with the second annular retaining spring. The assembly is completed by pressing the first retaining spring past the annular lip whereby its outer diameter springs back to a normal unbiased position thereby securing it in place. Accordingly, the shaft is simple and easily assembled to the case part with a predetermined end play.

It is an object of this invention to provide a bearing support assembly for dynamoelectric machines wherein one end of the machine shaft is mounted to one of a pair of housing case parts and is carried by a bearing which is supported axially by a pair of annular retaining springs, and further wherein the bearing is axially confined to the shaft end with a predetermined axial clearance so as to provide a desired limit of axial shaft movement.

A further object of this invention is to provide a bearing support assembly for small dynamoelectric machines wherein a first annular retaining spring supports the inner axial side of a bearing which is rotatably mounted on the shaft with a predetermined axial clearance and wherein a second annular retaining spring supports the outer axial side of the bearing, and further wherein both of the retaining springs are held within an extended end portion of a case part by an annular lip which extends over the opening to the end portion.

And a still further object of this invention is to provide a method of manufacture for assembling a bearing support assembly of a dynamoelectric machine to a shaft end in which a first annular retaining spring is mounted on an inner axial side of the bearing and the bearing is held axially on the shaft by a thrust collar fastened to the end of the shaft, and further wherein a second retaining spring is mounted in a recessed area of one case part with an annular lip being formed by a brush holder support plate partially enclosing the opening to the recessed area, the shaft is then simply mounted in the bearing support assembly and to the case part by pressing the outer diameter of the first annular retaining spring against the edge of the annular lip so that axial force presses the first retaining spring past the annular lip and the outer diameter resiliently assumes a radially outward position against the side of the annular lip, accordingly, the ends of the bearing are axially biased by the retaining springs and the shaft is located axially with a desired limit of shaft end play.

Further objects and advantages of the present invention will be apparent from the following description, reference being had to the accompanying drawings, wherein a preferred embodiment of the present invention is clearly shown.

Figure 1:
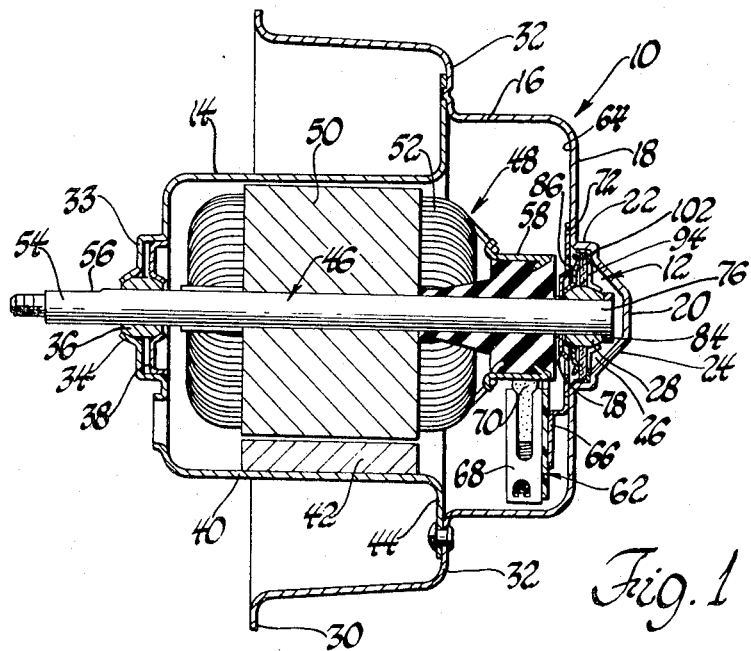
FIG. 1 is a sectional side elevational view illustrating a dynamoelectric machine including the bearing support assembly of the present invention.

Referring now to the drawing wherein the same numeral is used to designate the same or like part throughout the several figures, and more particularly referring to FIG. 1 wherein a dynamoelectric machine 10 is illustrated including the bearing support assembly 12 of this invention. For purposes of describing the present invention, the dynamoelectric machine 10 embodies a small or fractional horsepower type of direct current blower motor for automotive vehicles similar to that disclosed and claimed in the U.S. Pat. No. 3,264,506 for a Dynamoelectric Machine, issued Aug. 2, 1966, and assigned to the assignee of this invention.

A divided housing arrangement for the machine 10 is formed by a pair of case parts 14 and 16. The rearward case part 16 is cup shaped and is made of a sheet metal material terminating in a rearward closed end 18 which forms one end of the housing. An extended end portion 20 is formed in the center of the closed end 18 by suitable press forming techniques. A circular and axially extending section 22 terminated by a frustoconical shaped section 24 defines the extended end portion 20. A recessed area 26 formed inside of the end portion 20 receives the bearing support assembly 12 which carries a shaft bearing 28 in accordance with the present invention as more fully described hereinbelow.

The case part 16 extends forward from the closed end 18 to an open end having a radial mounting flange 30 with an intermediate radial section 32 being formed between the ends thereof. The mounting flange 30 has a series of openings, not shown, which receive threaded studs for mounting the machine 10 to a support surface.

The forward case part 14 is also cup-shaped and is made of a sheet metal material similar to that forming the case part 16. An end portion 33 providing the other and open end of the housing includes a spherical seat 34 formed in the center thereof. A shaft bearing 36 is supported by the seat 34 in axial alignment with the bearing 28. A bearing retainer 38 holds the bearing 36 in the spherical seat 34.

The case part 14 extends rearwardly along a main section 40 which carries a stator field producing assembly formed by a permanent magnet 42. A radial lip 44 terminates the rearward end of the case part 14 and is attached to the radial section 32 of the case part 14 by means of welding and rivets. The case parts 14 and 16 enclose and support the stationary and rotating parts of the machine 10.

A shaft 46 carries a rotor assembly 48 which includes a magnetizable armature core 50 that has wound thereon an armature winding 52. The armature core 50 is mounted on a center portion of the shaft 46 adjacent the permanent magnet 42. The driving end 54 of the shaft 46 is rotatably supported in the bearing 36 and extends externally of the case part 14. The shaft end 54 includes a flat mounting area 56 adapted for fastening to a driven member such as a fan blower as described in the aforementioned U.S. Pat. No. 3,264,506. In such uses, it is desirable that the inner extremity of the mounting area 56 be provided at a fixed axial distance from the mounting flange 30 to properly orient the member to be driven by the motor.

The rotor assembly 48 further includes a commutator assembly 58 located adjacent the rearward end of the armature core 50. Wire leads from the armature winding 52 are connected to the segments of the commutator assembly 58. A brush holder brush holder assembly 62, disclosed and claimed in copending application Docket No. A-11,996, and assigned to the assignee of this invention, is carried by an inner radial sidewall 64 formed by the closed end 18 of the case part 14. A support plate 66 carries brush holding receptacles 68 adjacent the commutator assembly 58. Carbon brushes 70 mounted in the receptacles 68 are biased into wiping contact with commutator segments.

Figure 2:
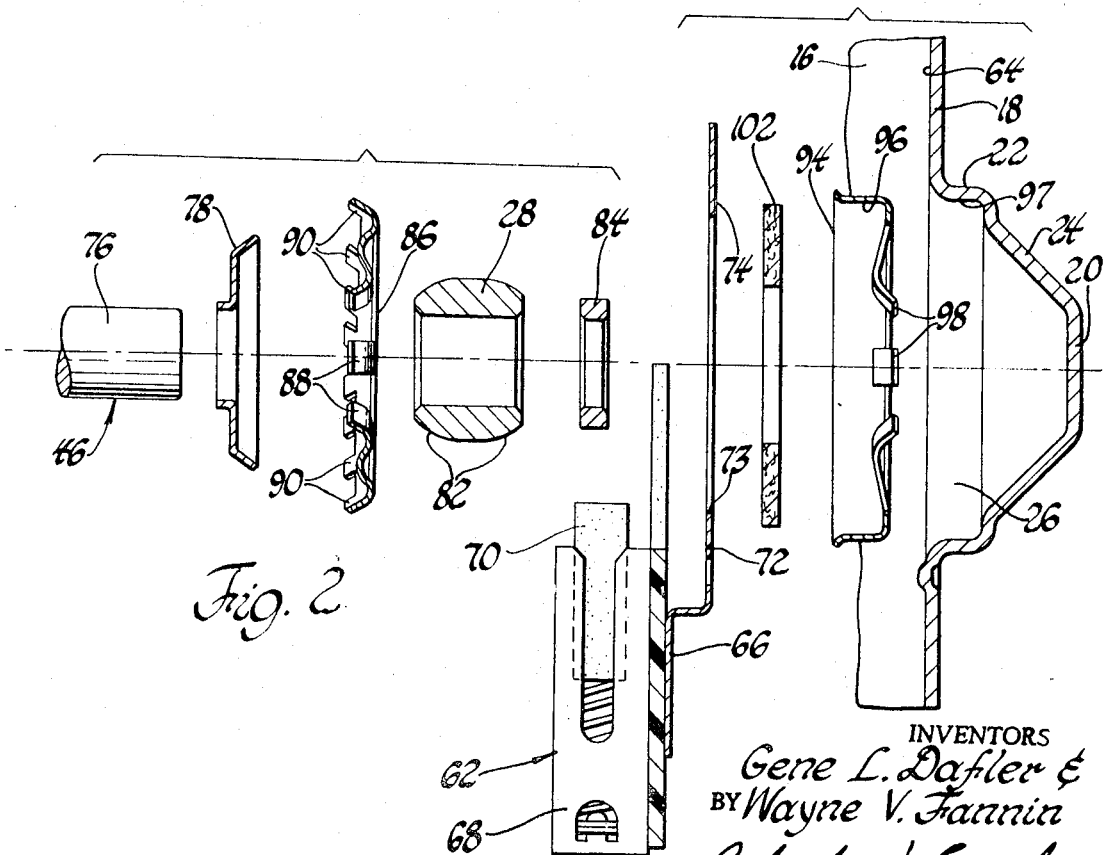
FIG. 2 is an exploded view in section illustrating the principal parts of the bearing support assembly illustrated in FIG. 1.

The support plate 66 includes an annular mounting ring 72 which is fastened to the sidewall 64 of the case part 18. The inner circular edge 73 of the mounting ring 72, as indicated in FIG. 2, has a slightly smaller diameter than the opening to the recessed area 26. Accordingly, the mounting ring 72 extends radially inward over the opening to the recessed area 26 so as to form an annular lip 74 which partially encloses the opening.

The brushes 70 of the brush holder assembly 62 are adapted to conduct current to the commutator assembly 58 and through the armature winding 52 so that the armature current electrodynamically reacts with the stator field produced by the permanent magnet 42 to rotate the shaft 46 in a manner well understood by those skilled in the art of dynamoelectric machines.

Figure 5:
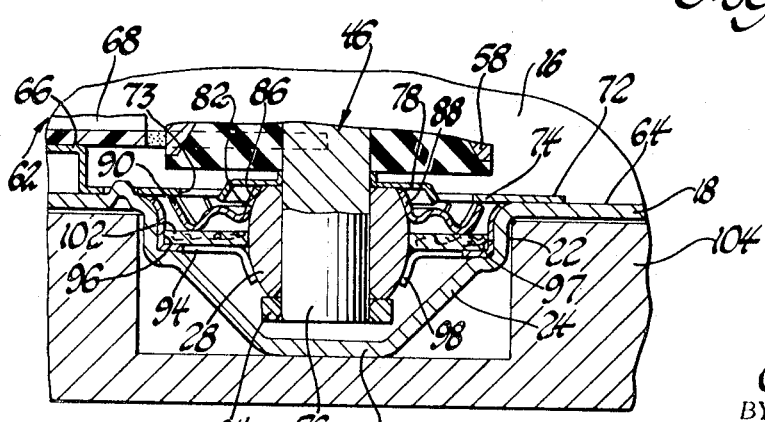
FIG. 5 is an enlarged view illustrating the bearing support assembly of this invention in the final assembled form.

Referring now more particularly to the bearing support assembly 12, illustrated as assembled in FIGS. 1 and 5 and in the exploded view of the FIG. 2, the extended end portion 20 of the case part 16 supports the bearing 28 and the rearward end 76 of the shaft 46 by means of the assembly 12 in accordance with a principal feature of this invention. The rearward shaft end 76 carries an oil slinger 78 adjacent the end of the commutator assembly 58. A center hole opening of the oil slinger 78 has an interference fit with the shaft end 76 and is press fitted thereon so as to rotate with the shaft 46. The oil slinger 78 may be replaced by an integral oil slinger formed in the end of the commutator assembly 58 as disclosed and claimed in U.S. Pat. No. 3,129,350 issued Apr. 14, 1964 and assigned to the assignee of this invention. The oil slinger 78 prevents discharge of lubricating oil from the bearing 28 onto the segments of the commutator assembly 58. The outer end of the oil slinger 78 is flared so as to centrifugally return oil to the recessed area 26 surrounding the bearing 28.

The bearing 28 is rotatably mounted on the shaft end 76 axially adjacent the oil slinger 78. The bearings 28 and 36 are made of a porous bearing metal composition and are substantially identical. The outer surfaces 82 of the bearings are substantially convex spherical shaped.

A thrust collar 84 formed by a metal ring having a tight interference fit with the shaft end 76 is press fitted on the terminal section of the shaft end 76. The thrust collar 84 axially confines the ends of the bearing 28 between the end of the rotor assembly 48 formed by the oil slinger 78 and the inner side of the thrust collar 84. In one preferred one preferred embodiment, a predetermined axial clearance for the bearing is provided in the order of five to six thousandths of an inch. This establishes the desired limit of shaft end play or axial shifting movement of the shaft 46 within the bearings 28 and 36, as described further hereinbelow.

A first or forward annular retaining spring 86 supports the forward or inner axial side of the bearing 28. A circumferential series of radially inward extending inner resilient fingers 88, illustrated in FIG. 2, are formed around inner diameter of the annular retaining spring 86. The resilient fingers 88 are bent arcuately so that the ends are flared forward for engagement with the bearing surface 82. A circumferential series of radially outward extending outer resilient fingers 90 are provided on outer diameter of the retaining spring 86 and are also bent arcuately so that the ends are flared forward. In the embodiment illustrated, six of the inner resilient fingers 88 and sixteen of the outer resilient fingers 90 are provided. The resilient fingers 90 extend for a radial distance such that the ends define a larger diameter than the inner edge 73 of the mounting ring 72 and which radially overlaps the annular lip 74 when the retaining spring 86 is mounted on the bearing 28.

A second or rearward annular retaining spring 94 is mounted in the recessed area 26 and includes a rim 96 extending axially for a length substantially equal to the length of the cylindrical side wall 97 formed by the axially extending section 22. The diameter of the rim 96 is adapted for a sliding fit against cylindrical sidewall 97 for radial support thereby. The rearward side of the retaining spring 94 includes a circumferential series of radially inward extending resilient fingers 98. In the embodiment illustrated, six of the resilient fingers 98 are provided and they are bent arcuately so that the ends are flared to the rear. The outer ends of the resilient fingers 98 engage the axially rearward or outer side of the bearing 28.

An annular washer made of a porous fiber material provides a lubrication wick 102 mounted over the center of the bearing 28. The lubrication wick 102 is supported radially inside the rim 96 of the retaining spring 94. The wick 102 is supported axially between an outer radial portion of the retaining spring 86 and an outer radial side portion of the retaining spring 94. Oil hurled from the oil slinger 78 is absorbed by the wick 102 to maintain the bearing 28 lubricated.

In accordance with the description hereinabove, the opposite axial sides of the bearing 28 are supported between the resilient fingers 88 and 98 of the annular retaining springs 86 and 94, respectively. The resilient fingers 98 are forced to an axially rearward biased position so as to provide a resilient axially inward reaction force on the outer side of the bearing 28. With the ends of the outer resilient fingers 90 of the retaining spring 86 axially engaging the rearward side of the annular lip 74, a resilient outward directed reaction force is provided on the inner side of the bearing 28 by the resilient fingers 88 which are forced to an axially outward biased position. The annular lip 74 formed by the mounting ring 72 holds the annular retaining springs 86 and 94 and, accordingly, the wick 102 axially within the recessed area 26.

Figure 3:
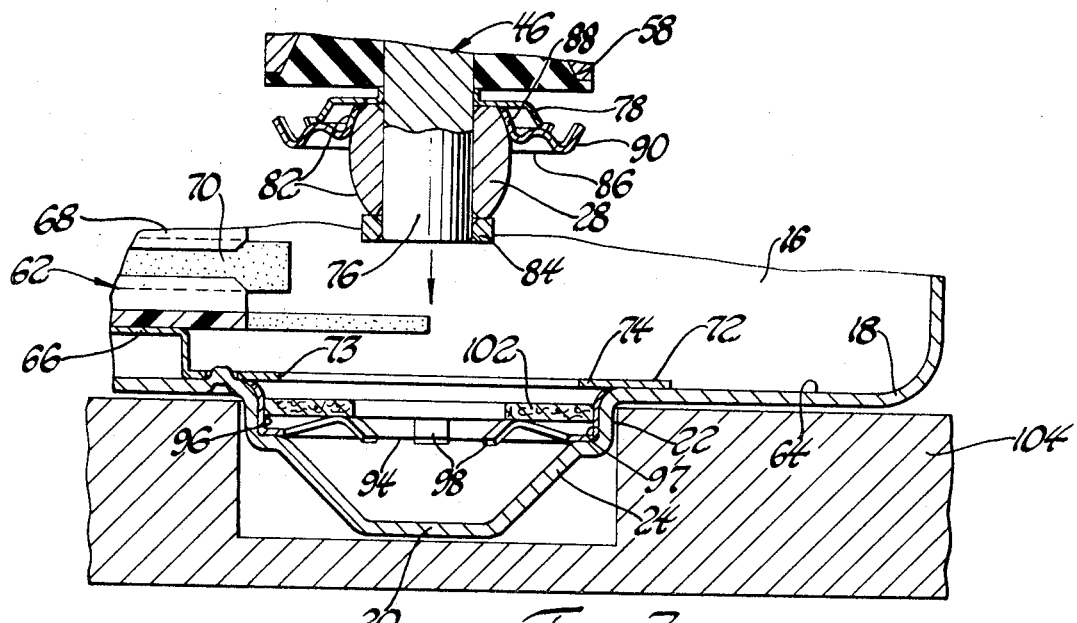
FIG. 3 is a side elevational view in section showing the parts of the bearing support assembly of this invention prior to assembling one end of the machine shaft to a case part.

In the method of manufacturing of the bearing support assembly 12 of the present invention, the oil slinger 78 is pressed on the shaft end 76 and against the commutator assembly 58. The bearing 28, having the annular retaining spring 86 mounted on the inner side thereof is slidingly fitted on the shaft end 76 and the thrust collar 84 is mounted on the terminal section of the shaft end 76 as illustrated in FIG. 3. The axial placement of the thrust collar 84 establishes the clearance at the ends of the bearing 28.

The axial clearance at the ends of the bearing 28 is provided by a removable shim having a predetermined thickness and which is mounted on the shaft end 76 adjacent the outer side of the bearing 28. The thrust collar 84 is then pressed on to the shaft end 76 and against the shim. This forces the inner side of the bearing 28 against the oil slinger 78. The shim is then removed leaving the desired axial spacing. Alternatively, a thrust collar 84 having a predetermined width may be provided so that when the outer side of the thrust collar 84 is pressed flush with the outer extremity of the shaft end 76, a desired axial clearance is provided between oil slinger 78 and inner side of the thrust collar 84. In either manner of providing the desired axial clearance, this clearance establishes the limit of axial movement or shifting of the bearing 28 on the shaft end 76.

The case part 16 has assembled thereto the retaining spring 94, the wick 102 and the brush holder assembly 62. The mounting ring 72 of the brush holder support plate 66 is mounted on the radial sidewall 64 of the case part 16. The mounting ring 72 then extends over the recessed area 26 to form the annular lip 74 for holding the retaining spring 94 in the recessed area 26.

Figure 4:
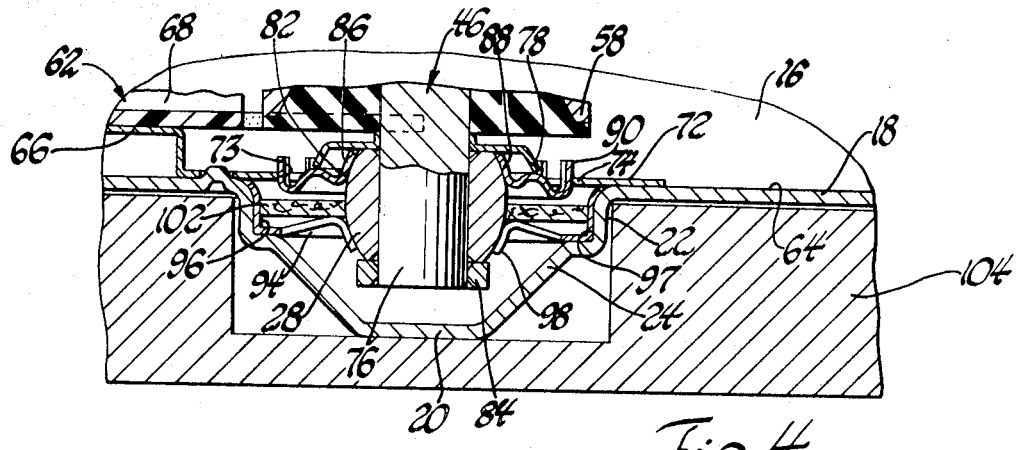
FIG. 4 illustrates an intermediate position of the shaft and case part shown in FIG. 3 while assembling the bearing support assembly of this invention.

The case part 16 is preferably mounted on a support fixture 104 with the closed end 18 oriented horizontally and the extended end portion 20 directed downwardly. The shaft 46 carrying the rotor assembly 48 is oriented vertically so that the shaft end 76 is generally aligned with the center of the extended end portion 20. The shaft end 76 is lowered so that the outer side of the bearing 28 initially engages the resilient fingers 98 of the retaining spring 94, as shown in FIG. 4. The ends of the outer resilient fingers 90 of the retaining spring 86 are compressed radially inward as they engage the inner peripheral edge 73 of the mounting ring 72. This urges the center of the shaft end 76 into alignment with the center of the opening formed by the edge 73. Accordingly, the outer side of the bearing 28 is aligned with the center of the end portion 22 and is centered with respect to resilient fingers 98 of the retaining spring 94.

The shaft end 76 is pressed further downward into the recessed area 26 until the outer resilient fingers 90 are located axially rearward of the annular lip 74. This releases the outer resilient fingers 90 from their compressed condition so that they snap or spring radially outward and behind the brush holder mounting ring 72 as shown in FIG. 5. The bearing 28 is then securely fastened in a fixed axial location in the case part 16 by the opposing resilient forces of the retaining spring fingers 88 and 98. The axial clearance provided between the ends of the bearing 28 and the oil slinger 78 and the thrust collar 84 determines the desired limits of shaft end play of the final motor assembly. Further, the mounting area 56 of the shaft 46 will be located axially relative to the mounting flange 30.

Following the assembling steps shown in FIGS. 3, 4 and 5, the case part 14, already having assembled thereto the bearing 36 within the bearing seat 34, is aligned with the shaft end 56 and the bearing is mounted thereon. The radial section 32 and radial lip 44 of the case parts 16 and 14 are secured together by means of welding and rivets, as noted hereinabove, to complete the assembly of the dynamoelectric machine 10.

While the embodiment of the present invention as herein disclosed constitutes a preferred form, it is understood that other forms may be adopted in accordance with this invention.

What is claimed is:

1. In a dynamoelectric machine having a divided housing including a case part terminating in an extended end portion and a shaft for carrying a rotor assembly that is rotatable in said housing, a bearing support assembly, comprising: a lip portion extending radially over the inner opening of a recessed area formed by said extended end portion; a bearing rotatably mounted on one end of said shaft; a thrust collar secured to a terminal section of said shaft end and axially confining said bearing between said rotor assembly and said thrust collar; a first annular retaining spring including resilient fingers engaging the inner axial side of said bearing, and further including outer resilient fingers engaging the outer axial side of said lip portion; and a second annular retaining spring mounted within said recessed area, said second retaining spring including inner resilient fingers engaging the outer axial side of said bearing for supporting said bearing in a fixed axial position within said case part, whereby said shaft is rotatably mounted to said case part so as to limit axial shifting movement of said shaft.

2. In a dynamoelectric machine having a divided housing including a case part terminating in an extended end portion and a shaft for carrying a rotor assembly that is rotatable in said housing, a bearing support assembly comprising: an annular lip partially enclosing the inner opening of a recessed area formed by said extended end portion; a bearing rotatably mounted on one end of said shaft; a thrust collar secured to a terminal section of said one shaft end so as to define a predetermined axial clearance at the ends of said bearing between the end of said rotor assembly and said thrust collar; a first annular retaining spring including inner resilient fingers engaging the inner axial side of said bearing; said first retaining spring further including outer resilient fingers compressively insertable through said annular lip and engaging the outer axial side of said lip portion; and a second annular retaining spring mounted within recessed area, said second retaining spring including inner resilient fingers engaging the outer axial side of said bearing for supporting said bearing in a fixed axial position within said case part, whereby said shaft is rotatably mounted to said case part so as to have a limited axial movement relative to said housing determined by said predetermined axial clearance of said bearing.

3. In a dynamoelectric machine having a divided housing including a case part forming a radial mounting portion at one end and an extended end portion at the other end, a shaft carrying a rotor assembly including a commutator and an oil slinger adjacent said commutator, and a brush holder assembly supporting brushes engaging said commutator, a bearing support assembly comprising: a support plate of said brush holder assembly secured to said case part so as to form an annular lip around the opening of a recessed area formed by said extended end portion; a bearing rotatably mounted on one shaft end; a thrust collar secured to a terminal section of said one shaft end to limit axial shifting of said bearing between said oil slinger and the thrust collar; a first annular retaining spring including a circumferential series of inner resilient fingers engaging the inner axial side of said bearing, said first retaining spring further including a circumferential series of outer resilient fingers wherein the finger ends are insertable through said annular lip by being biased radially inward so as to engage the outer axial side of said lip portion when released to a radially extended position; and a second annular retaining spring having an outer rim supported by said extended end portion and secured axially by said outer axial side of said annular lip, said second retaining spring further including a circumferential series of inner resilient fingers opposingly complementary to said inner fingers of said first retaining spring and engaging the outer axial side of said bearing for supporting said bearing in a fixed axial position within said case part, whereby said shaft is rotatably mounted to said case part in a predetermined axial position with limited axial end play.

4. In a method of manufacture for assembling the shaft of a dynamoelectric machine to a case part forming one end of a housing for said dynamoelectric machine, the steps comprising: inserting one end of said shaft through a first annular retaining spring having inner and outer radially extending resilient fingers; sliding a bearing on said shaft end and against said inner fingers of said first annular retaining spring; securing a thrust collar on a terminal section of said shaft end thereby limiting the axial shifting movement of said bearing on said shaft; mounting a second annular retaining spring having inner radially extending resilient fingers in a recessed area formed by said extended end portion of said housing case part; providing a lip portion extending radially over the opening to said recessed area; inserting said shaft end toward the inner side of said case part with said shaft end being directed into said recessed area so that the outer side of said bearing engages said inner resilient fingers of said second retaining spring and said outer resilient fingers are compressed radially inward by said lip portion; and terminating the inserting of said shaft end when said outer resilient fingers are released to an uncompressed position on the outer side of said lip portion and said inner resilient fingers of said first and said second retaining springs support the bearing and are mutually biased apart by the ends of said bearing, whereby said shaft end is rotatably mounted to said case part with limited axial end play.

5. In a method of manufacture for assembling one end of a shaft of a dynamoelectric machine carrying a commutator assembly to a bearing support assembly carried by an extended end portion of a housing case part, the steps comprising: placing said shaft end through a first annular retaining spring having inner and outer radially extending resilient fingers; mounting a bearing on said shaft end so that said shaft is rotatable therein; securing a thrust collar on a terminal section of said shaft end to define a predetermined axial clearance at the ends of said bearing; mounting a second annular retaining spring including an outer rim and inner radially extending resilient fingers in a recessed area formed by said extended end portion; axially securing said second annular retaining spring within said recessed area by a mounting ring part of a brush holder assembly fastened to said housing case part so as to form an annular lip extending radially over the opening to said recessed area; inserting said shaft end toward the inner side of said case part with said shaft end being directed into said recessed area so that the outer axial side of said bearing engages said inner resilient fingers of said second retaining spring, and said outer resilient fingers are compressed radially inward by said lip portion; and terminating the inserting of said shaft end when said outer resilient fingers are released to an uncompressed position for engaging the outer side of said annular lip with said inner resilient fingers of said first and said second retaining springs supporting said bearing in a fixed axial position by being biased outwardly from the ends of said bearing, whereby said shaft end is rotatably mounted to said case part so as to include a predetermined limit of axial end play.

* * * * *